Oct. 25, 1932.  A. B. MODINE  1,884,099
HEAT EXCHANGE DEVICE
Filed Feb. 1, 1930  4 Sheets-Sheet 1
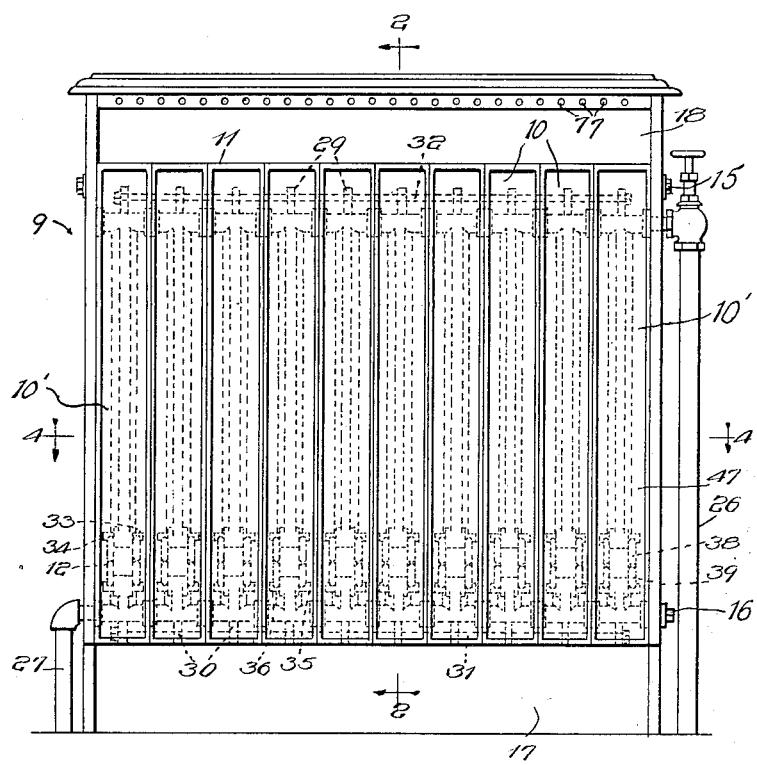
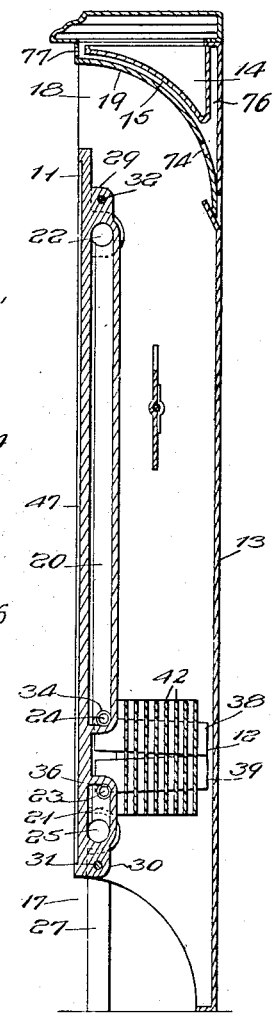
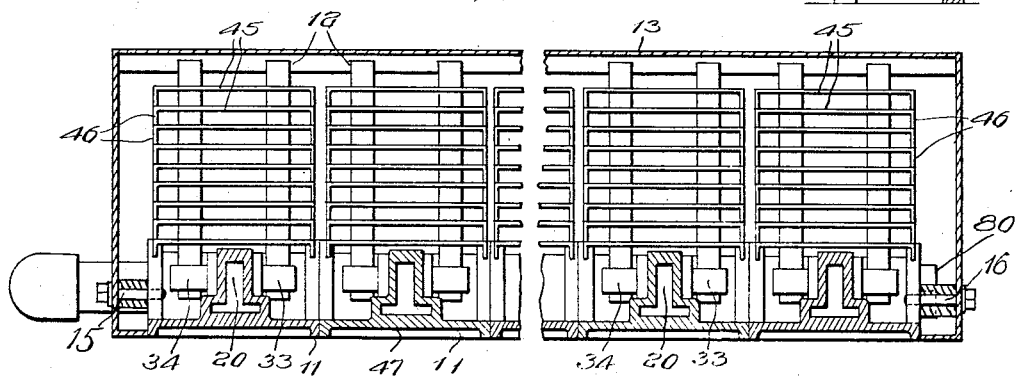
Inventor
Arthur B. Modine
By Hill & Hill
Attys Oct. 25, 1932.  A. B. MODINE  1,884,099
HEAT EXCHANGE DEVICE
Filed Feb. 1, 1930  4 Sheets-Sheet 2

Witness:
William P. Kilroy

Inventor:
Arthur B. Modine
By Hill & Hill
Attys

Oct. 25, 1932.  A. B. MODINE  1,884,099
HEAT EXCHANGE DEVICE
Filed Feb. 1, 1930    4 Sheets-Sheet 3
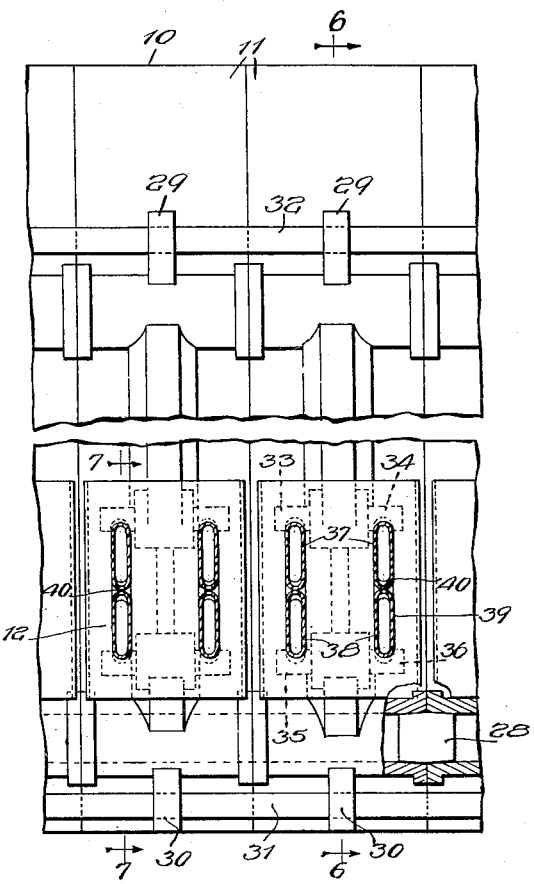
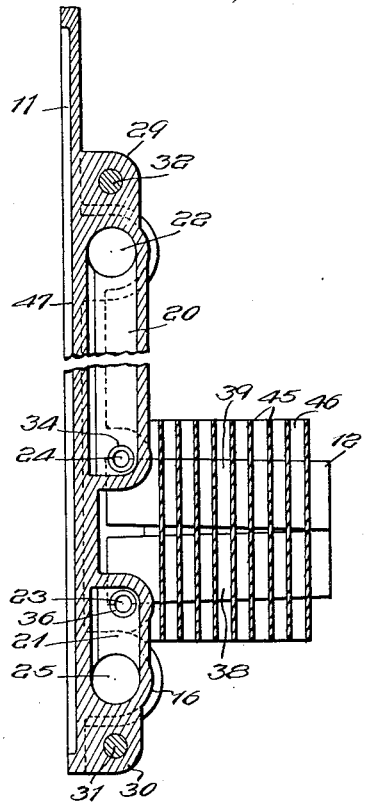
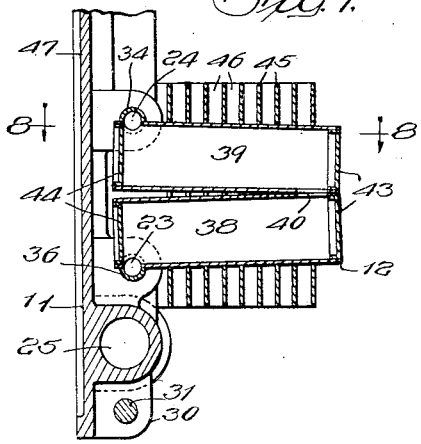
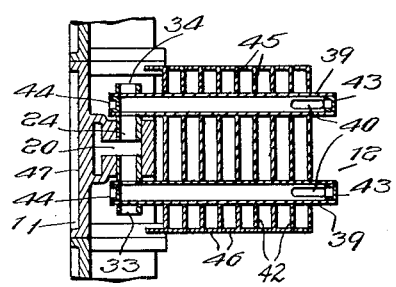
Inventor:
Arthur B. Modine Oct. 25, 1932.                A. B. MODINE                1,884,099
                           HEAT EXCHANGE DEVICE
                           Filed Feb. 1, 1930           4 Sheets-Sheet 4
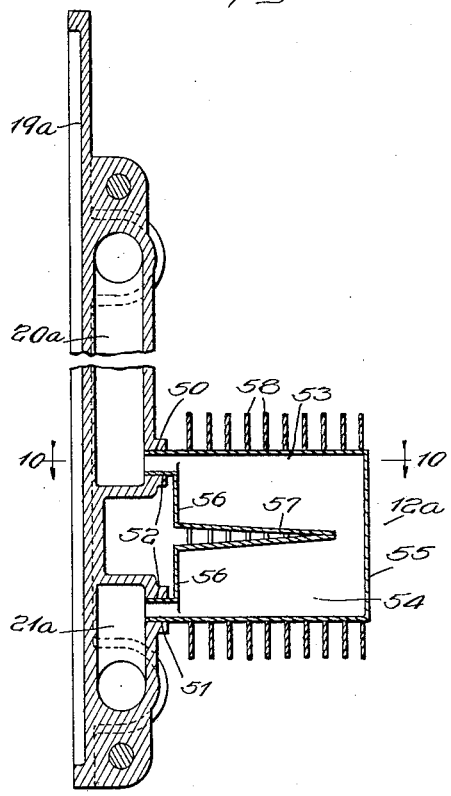
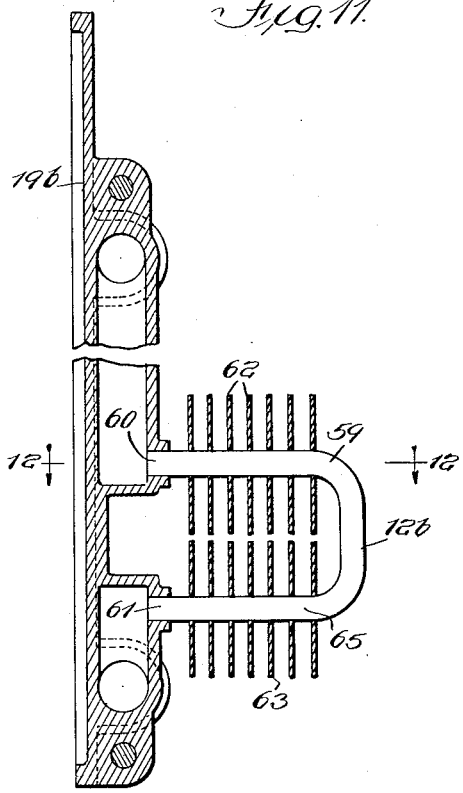
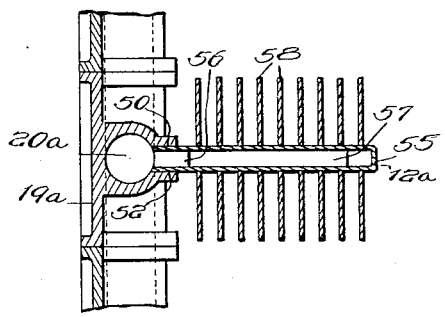
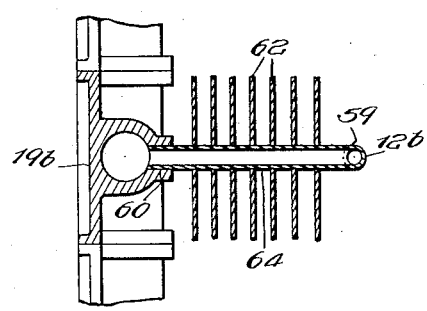
Witness:
William P. Kilroy
Inventor:
Arthur B. Modine
By Hill & Hill
Attys Patented Oct. 25, 1932

1,884,099

UNITED STATES PATENT OFFICE

ARTHUR B. MODINE, OF RACINE, WISCONSIN, ASSIGNOR TO MODINE MANUFACTURING COMPANY, OF RACINE, WISCONSIN, A CORPORATION OF WISCONSIN

HEAT EXCHANGE DEVICE

Application filed February 1, 1930. Serial No. 425,157.

The invention relates to heat exchange devices and is primarily designed to provide means for heating by radiation and convection.

It is another object of the invention to provide a construction comprised of elements arranged relatively to each other so as to accomplish heating by radiation and convection, one of which is formed of relatively thin material, the other being cast or otherwise formed and having the former cast integral, brazed or otherwise secured thereto, the elements forming the construction being designed so that heating fluid may be introduced and circulated therethrough.

Another object of the invention is to provide a construction capable of resulting in the accomplishment of heat transference in which the elements are connected with each other in a manner to compel any air contained therein to be forced therefrom upon the introduction of a heating medium thereto which will thus insure proper circulation of the heating medium and increase the heating efficiency of the device.

A further object of the invention is to construct one of the elements of relatively thin material and to provide said element with an inlet and outlet which communicates with a fluid passage produced in the other element.

Another object of the invention is the provision of a construction which will compensate for the expansion and contraction of both elements relatively to each other without resulting in breakage or causing a leak at the connection between the elements.

It is a further object of the invention to provide a sectional element embodying means for heating by radiation and convection which is adapted to be associated with another similar section to thus provide a unit composed of several of said sections, each section having a means for heating by convection and radiation, said means for heating by radiation and convection being connected with each other so that circulation of the heating fluid from one to the other of said means is accomplished, the element for heating by convection being arranged relatively to the element for heating by radiation so that the former extends in a lateral direction relatively thereto to thereby arrange said element so that it will engage relatively cool air, heat the same and cause its discharge from the casing in which the device is housed.

Another principal object of the invention is to provide an element which provides a section of a heating unit comprised of several of said sections, each section having means for heating by radiation and convection, the means for heating by radiation having a fluid passage, the opposite ends of which are designed to be associated with other similar sections to thereby provide a construction which is flexible as to heating capacity. An added object of the invention is the provision of an element having a fluid passage and a plate or other element which contacts with the fluid passage so that said plate is heated by the heating fluid circulating through the passage and thus provide means for heating by radiation.

The invention has these and other objects, all of which will be explained in detail and more readily understood when read in conjunction with the accompanying drawings which illustrate various embodiments of which the invention is susceptible, it being, therefore, obvious that other constructions may be resorted to without departing from the spirit of the appended claims forming a part hereof.

In the drawings, Fig. 1 is a front elevation of a heat exchange constructed according to the invention;

Fig. 2 is a section taken on the line 2—2 of Fig. 1 showing the structure encased and arranged in a recess provided in a wall;

Fig. 4 is a section taken on line 4—4 of Fig. 1;

Fig. 5 is a rear elevation showing a plurality of the elements shown in Fig. 1 associated with each other;

Fig. 6 is a section taken on the line 6—6 of Fig. 5;

Fig. 7 is a section taken on the line 7—7 of Fig. 5;

Fig. 8 is a section taken on the line 8—8 of Fig. 7;

Fig. 9 is a section similar to Fig. 6 showing a modified arrangement;

Fig. 10 is a section taken on line 10—10 of Fig. 9;

Fig. 11 is a section similar to Fig. 9 showing still another structure which may be resorted to;

Fig. 12 is a section taken on line 12—12 of Fig. 11; and

Figs. 13, 14 and 15 are views illustrating still other structures which may be resorted to, to accomplish the various advantages above referred to.

Figure 3:
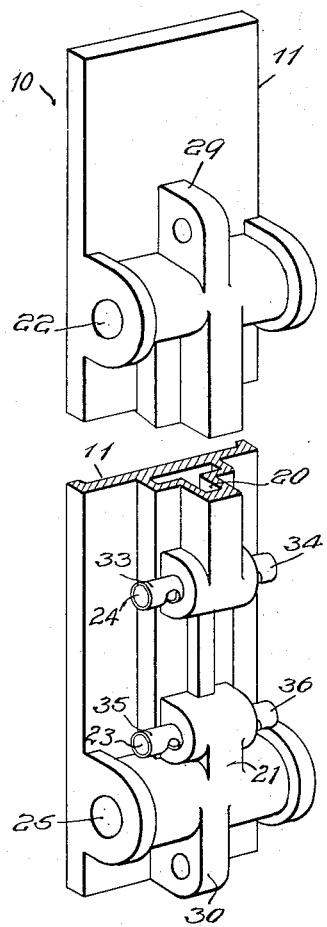
Fig. 3 is a perspective view of the rear side of one of the sections shown in Fig. 1.

By referring to Fig. 1, it will be noted that the heat exchange device generally designated 9, includes a plurality of separate or individual heat exchange sections 10. By referring particularly to Fig. 2, it will be seen that each of these individual sections 10 includes plate means 11 for heating by radiation and a means generally designated 12 for heating by convection. Since all of the several sections generally designated 10 substantially correspond with similar sections, an explanation of the construction of one will suffice for an understanding of all. A unit composed of the sections generally designated 10 including the means for heating by convection and designated 12 are designed to be arranged in a recess provided in a wall or be housed in a casing to which air to be heated is introduced, heated and then discharged therefrom into the room in which the heater is located. The casing in which the heat exchange device generally designated 9 is located is designated 13 and may have a humidifier 14 associated therewith so that heated air discharged into the room may be moistened. The heat exchange device generally designated 9 is secured to the casing 13 by means of any suitable agency such as bolts, cap screws 15 or other holding devices. The heat exchange device 9 is arranged relatively to the lower end of the casing so that a passage or opening 17 is provided between the lower extremity of the heat exchange device and the floor of the room in which the device is located which will thus allow the relatively cool air existing in the lower portion of the room to enter the casing 13, pass between the heat exchange device generally designated 12, be heated thereby and thence be discharged through an opening 18 arranged at the uppermost portion of the casing. To further increase the moisture contents of the heated air to a more normal condition as it is discharged from the casing, there is a curved deflector 19 having openings 74 therein, affixed and arranged in a spaced relation to the humidifier 14 to thereby provide a passage 75 and a chamber 76. It will thus be evident that a portion of the air as it is heated and passes upwardly through the casing will enter through the openings 74 and circulate in the chamber 76 and passage 75 and thence be discharged through openings 77, it being mainly induced through the outlet openings 77 by reason of the draft or circulation set up by that portion or volume of heated air that is discharged through the opening 18.

Each of the sections generally designated 10 include a plate 11 having separated fluid passages 20 and 21, the individual passages 20 and 21 each being respectively provided with a fluid inlet passage 22 and 23 and a fluid outlet passage 24 and 25. The means for heating by convection and generally designated 12 is in communication with the outlet 24 of the passage 20 and also communicates with the inlet 23 of the passage 21 which thus provides means permitting circulation of a heating fluid from a supply pipe such as 26 through the inlet 22, passage 20, outlet 24, through the element 12, inlet 23, passage 21 and outlet 25, the latter of which is connected with a fluid outlet 27 which allows heating fluid to circulate through the device, heat the plate 11 and thus provide means for heating by radiation and in addition causes the element 12 to be heated and the heat thereof to be transmitted to air circulating through the casing 13.

By referring particularly to Figs. 3 and 5, it will be noted that the tubular portions forming the passages 22 and 25 substantially correspond in length to the width of the plates 11 of each section, the opposite ends of the passages 22 and 25 being adapted to receive a means such as a nipple 28 which provides means for connecting the several sections 10 with each other to provide a unit comprised of several of said sections. Each section such as 10 is further provided with the apertured lugs 29 and 30 through which bars 31 and 32 are respectively adapted to be passed to provide means for increasing the rigidity of the structure comprised of several of the units, it being understood that these rods may be threaded to accept a nut to thereby hold the several sections in unitary relation with each other. Obviously a plug 80 is provided to prevent the fluid from passing out the other end of the passage 25.

The invention contemplates the utilization of sections such as 10, each of which is provided with either a single element for heating by convection or a plurality of said elements, the elements being connected in a manner so that the heating fluid is introduced to the means for heating by radiation and thence to the means for heating by convection or vice versa.

In Fig. 5 is illustrated a construction which may be resorted to when it is desired to associate a plurality of elements such as 12 with the plates 11 of each section. To this end, the passage 20 is provided with a plurality of laterally projecting tubular extensions respectively designated 33 and 34 which are located at the outlet of the passage 20 and the passage 21 is provided with similar tubular extensions 35 and 36 to thereby provide means for completing a connection between the passages 20 and 21 when the elements 12 are associated therewith, it being understood that an element such as 12 is respectively associated with each pair of tubular extensions 34 and 36. The means 12 for heating by convection is comprised of a pair of hollow fluid conducting legs 37 and 38 which are connected together at 39 and have an aperture 40 providing means of communication between the legs, it being understood that the opposite end of each leg is respectively connected with one of the pairs of tubular extensions such as 34, 36, 33 and 35. In other words, each plate 11 may be provided with a plurality of means for heating by convection which are served with fluid from what in effect is a single passage connected with a fluid supply and return.

From this it can be seen that each individual section is comprised of a plate such as 11, fluid conducting passages 20 and 21 which, as the fluid circulates therethrough, will heat the plate 11 and heat the surrounding atmosphere by radiation and in addition includes the lateral extending elements 12 whereby air is heated and discharged from the casing by convection, the elements 12 being connected with the fluid passages 20 and 21 so that fluid entering either of these passages is compelled to circulate through the elements 12 prior to its introduction to either of the passages 20 or 21, depending upon whether the fluid is introduced to the structure through the passage 25 or the passage 22.

It will be further noted by referring to Fig. 5 that each of the legs 37 and 38 of the means for heating by convection is of relatively thin material and is of a flat or elongated cross section which will accept a substantial quantity of the heating fluid and become quickly heated which thus adds to the heating efficiency of this portion of the structure. As before stated, the connection between the means 12 and the plate 11 may be formed by casting or brazing these portions together.

It will be noted by reference to Figs. 2 and 6 and other views of a similar character, that the legs such as 37 and 38 of each heater unit 12 are supported at one end only which allows the opposite ends thereof to be freely displaced in an endwise direction and thus compensate for the expansion and contraction thereof without resulting in injury or breakage at their connection with the structure including the plate 11. It will further be noted that the construction of the heater units 12 also permits movement of the legs in a lateral direction relatively to each other which will compensate for linear expansion and contraction of the plate 11. The heater unit generally designated 12 may be provided with a plurality of heat radiating fins 42 which will further increase the heating capacity of this portion of the structure and result in greater efficiency of the device. Since the legs 37 and 38 are of a tubular formation, it is manifest that some means must be provided for closing the free ends thereof, this may be accomplished in any suitable manner, as for instance, by the caps 43 and 44 which are inserted into the ends of the legs and then braced, soldered or otherwise secured to the legs.

By referring particularly to Fig. 8, it will be noted that each of the fins 42 have the opposite side edges thereof formed to produce the flanges respectively designated 45 and 46 which in effect provide a plurality of parallel air passages between the plates which compel any air entering the casing to contact with the fins and the tubes and thus insure contact between the legs of the heater 12 and the air during its travel between said fins. It may be here stated that each plate 11 is provided with a recess such as that designated 47 which will confine and cause a certain amount of air contacting with the plates to travel lengthwise of the plate and thus effectively heat the air during its travel along the plate.

The structure illustrated in the form shown in Fig. 9 substantially corresponds to that previously explained, however, the heater unit 12a is of a slightly different construction from the heater 12 and the connection formed between it and the fluid passages 20a and 21a is also of a slightly modified character. In this last mentioned construction, each of the fluid passages 20a and 21a are provided with apertures 50 and 51 into which the tubular extensions 52 of the heater element 12a are inserted to complete a connection between the passages 20a and 21a and the heater element 12a. The heater element 12a includes the tubular communicating legs 53 and 54 one end of which is closed through the medium of the end wall 55, the opposite ends of the legs are each closed by the walls 56—56 which are respectively provided with the tubular extension 50 and 51. The wall 57 produced between the legs is formed to provide means permitting lateral separation of the legs 53 and 54 to thus provide for linear extension of the heater plate 19a, it being, of course, understood that the construction of the heater element 12a permits of expansion and contraction thereof in an endwise direction for the purpose described with relation to the structure shown in Fig. 6. This construction may also be provided with heat radiating fins such as 58 which surround the legs.

The heat radiating unit 19b illustrated in Fig. 11 substantially corresponds to that shown in Fig. 9; however, the heating radiating unit 12b differs somewhat from the previously described structures in that each heater unit 12b is comprised of a tube 59 which is substantially U-shaped in outline and has the opposite ends 60 and 61 thereof connected to the heater unit 19b in a manner and for the purpose described in connection with the previously described devices. This structure is also provided with sets of heat radiating fins respectively designated 62 and 63 which are secured to the respective legs 64 and 65 of this construction.

Figure 13:
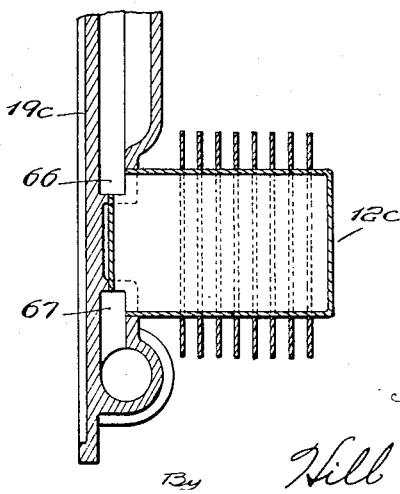

The structure shown in Fig. 13 contemplates the utilization of a heater element such as 19c and heater element 12c. This last mentioned portion of this structure differs from previous similar elements in that the element 12c is formed of a hollow unit which provides a hollow chamber, one wall of which is provided with a pair of ports 66 and 67 which communicate with fluid passages such as 20 and 21 of the structure shown in Fig. 6 and thus will allow fluid to circulate from one of these passages through the ports into the chamber 12c, the latter of which forms a means for heating by convection.

Figure 14:
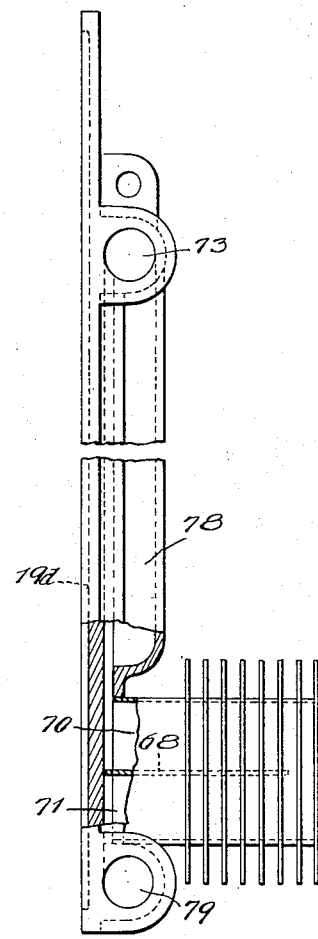
Figure 15:
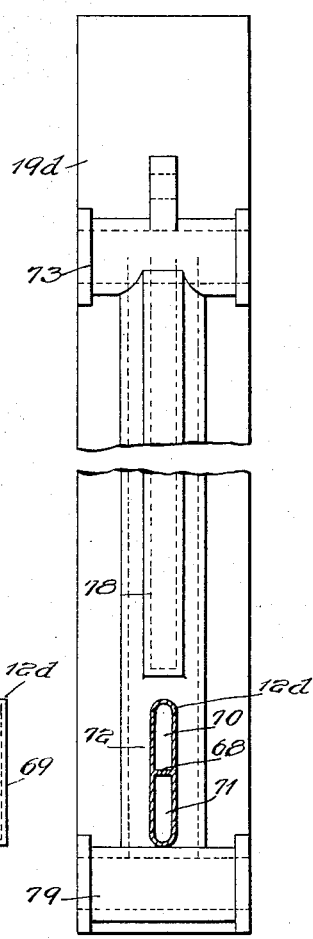

The structure shown in Figs. 14 and 15 includes a heater element 12d and a heater element 19d. The heater element 12d is provided with a centrally arranged wall 68, one end of which terminates short of the wall 69 and extends a suitable distance beyond the opposite open end of element 12d which thus provides openings 70 and 71. The heater element 19d is provided with an elongated opening 72 into which the open end of the heater element 12d is inserted. The extending portion of the wall 68 extends into the passage 72 and divides the opening 72 and provides a passage which compels the fluid to circulate from one portion of the fluid passage of the element 19d to the other. In other words, the wall 68 provides a baffle compelling circulation of the fluid through the legs or tubular passages formed in the heater unit 12d. Whereas, all of the structures previously described are capable of being cast integral with the plate such as 11, this last mentioned arrangement is particularly adapted to accomplish this. It is to be understood that passages similar to those formed and described in the plate 11 are provided, and in this instance the heater element 19d is provided with a fluid inlet passage 73 and a passage 78 communicating with an outlet 79. Obviously, suitable means are provided for securing the heater elements together as described in the preceding modifications.

From the foregoing description of the various constructions, it is manifest that a sectional construction is provided, each section of which is provided with means for heating by radiation and convection, the several sections being adapted to be associated with each other so as to provide a unit comprised of a plurality of sections and in which one of the heater units such as that for heating by convection extends in a lateral direction or transversely to the means for heating by radiation. It is further evident that the means for heating by convection is secured to the means for heating by radiation at one end only and includes a construction whereby the means for heating by radiation may expand and contract in a linear direction without resulting in leakage or breakage at the connection between the elements. It is further evident that by virtue of the construction of the means for heating by convection, that said means may expand and contract without effecting the connection between the heater elements, the expansion and contraction of the means for heating by radiation being compensated for primarily by virtue of the construction of the means for heating by convection.

Having thus described the invention, what I claim as new and desire to cover by Letters Patent is:

1. A heat exchange device comprised of a plurality of separate sections, each section having a fluid inlet and outlet which is adapted for communication with a fluid inlet and outlet of another section, each section having a fluid passage communicating with the inlet and outlet, said fluid passage having a portion thereof laterally offset relatively to another portion thereof, the laterally offset portion being arranged adjacent one end of said passage.

2. A heat exchange device comprised of an element having a fluid inlet and a fluid outlet, said element having a member providing a fluid passage extending from the inlet toward the outlet and a member providing a fluid passage extending from the outlet toward the inlet and laterally extending tubular element, the opposite ends of the tubular element being connected with adjacent ends of said passages.

3. A heat exchange device comprised of an element having a fluid inlet and a fluid outlet, fluid passages extending toward each other from said inlet and from said outlet and a laterally offset tubular member providing a connection between adjacent ends of said passages.

4. A heat exchange device comprised of an element having a fluid inlet and a fluid outlet, and having oppositely extending separate fluid passages respectively extending from said inlet and said outlet and a member located adjacent one end of said element providing a connection between adjacent ends of said fluid passages, said element and member respectively providing means for heating air by radiation and convection.

5. A heat exchange device comprised of an element having a fluid inlet and a fluid outlet and elements providing oppositely projecting separate fluid passages respectively extending from said inlet and outlet, a member having a U-shaped passage, the opposite ends thereof being respectively connected with said passages provided in adjacent terminations of said element.

6. A heat exchange device comprised of an element having a fluid inlet and fluid outlet, and elements providing passages projecting in opposite directions, respectively, from said fluid inlet and said fluid outlet and a hollow element providing means completing a communication between said passages, said hollow element providing means compensating for linear expansion of said first mentioned element.

7. A heat exchange device comprised of an element having a fluid inlet and a fluid outlet, and having oppositely projecting fluid passages respectively extending from said fluid inlet and outlet and a hollow element providing means for completing a communication between said first mentioned fluid passage and the inlet and outlet.

8. A heat exchange unit comprised of a plate, a tubular element providing a fluid passage extending longitudinally of said plate, transversely disposed tubular sections connected with the plate providing an element of means whereby one unit may be connected with another and providing an inlet and outlet for said tubular element, and a hollow member extending transversely of said plate and communicating with said tubular element.

9. A heat exchange unit comprised of a plate, tubular passages extending toward each other longitudinally of said plate, said passages each having a fluid inlet and a fluid outlet, the inlet of one passage being arranged adjacent the outlet of the other passage and being separated therefrom, and a hollow member connecting the outlet of one of said passages with the inlet of the other passage and being arranged transversely to the tubular passage and plate.

10. A heat exchange unit comprised of a plate, tubular passages extending longitudinally of said plate, one of said passages having an inlet and a plurality of outlets and the other having a plurality of inlets and an outlet, and a hollow member connected with each of said outlets and with each of said inlets.

11. A heat exchange unit comprised of a plate, tubular passages extending longitudinally of said plate, one of said passages having an inlet and a plurality of outlets and the other having a plurality of inlets and an outlet, and a plurality of tubular members having the opposite ends thereof respectively connected with one of said plurality of inlets and one of said plurality of outlets.

12. A heat exchange unit comprised of a plate, vertically aligned tubular passages extending longitudinally from one face of the plate, said passages each having an inlet arranged adjacent and in spaced relation to each other an outlet and a hollow open ended member extending laterally from said passages and plate and having its opposite ends connected and communicating with said tubular passages of said plate.

13. A heat exchange device comprised of a member providing means for heating by radiation and means connected therewith providing means for heating by convection, a heating fluid passage provided in each of said means which communicates with each other and said means for heating by convection providing means permitting expansion and contraction in a linear direction of the means for heating by radiation and said means for heating by convection including means allowing for endwise expansion and contraction thereof.

14. A heat exchange device comprised of a plate having tubular elements providing fluid passages extending inwardly relatively to the opposite ends of said plate, the adjacent ends of said passages terminating in spaced relation to each other and a tubular element having the opposite ends thereof connected with said adjacent ends of said fluid passages, said tubular element being extended from said plate at an angle to the plane of said plate.

15. A heat exchange device comprised of a plurality of plates, each plate having tubular elements providing fluid passages extending inwardly relatively to the opposite ends of said plates, the adjacent ends of said passages terminating in spaced relation to each other and a tubular member having the ends thereof respectively connected with the adjacent ends of said fluid passage, said tubular members being extended from said plates at an angle to the plane of said plate, the opposite ends of said tubular elements of one plate being connected with similar elements of an adjacent plate and respectively providing a fluid inlet and a fluid outlet for said first mentioned passages.

In witness whereof, I hereunto subscribe my name this 6th day of January A. D., 1930.

ARTHUR B. MODINE.

CERTIFICATE OF CORRECTION.

Patent No. 1,884,099.                                                       October 25, 1932.

ARTHUR B. MODINE.

It is hereby certified that error appears in the printed specification of the above numbered patent requiring correction as follows: Page 5, lines 3 and 4, claim 5, strike out the words "adjacent terminations of" and insert the same before "said" in line 3, same claim; line 65, claim 12, after "inlet" insert the words "and an outlet"; and line 67, strike out the words "an outlet and"; and that the said Letters Patent should be read with these corrections therein that the same may conform to the record of the case in the Patent Office.

Signed and sealed this 13th day of December, A. D. 1932.

M. J. Moore, (Seal)                                                             Acting Commissioner of Patents.